United States Patent [19]
Hensel et al.

[11] Patent Number: 6,023,042
[45] Date of Patent: Feb. 8, 2000

[54] APPARATUS FOR THE PRODUCTION OF EXPOSED AND METALLIZED SUBSTRATES

[75] Inventors: Bernd Hensel, Eschborn; Friedrich Hofmann, Büdingen; Hermann Koop, Ronnenberg; Manfred Reus, Freigericht; Eberhard Feick, München, all of Germany

[73] Assignee: Balzers Und Leybold Deutschland Holding AG, Hanau, Germany

[21] Appl. No.: 08/827,479

[22] Filed: Oct. 4, 1996

[51] Int. Cl.⁷ .................................................. B23K 26/00
[52] U.S. Cl. .................................. 219/121.82; 198/347.1
[58] Field of Search ....................... 219/121.82, 121.68, 219/121.69; 118/56, 66; 427/470, 532; 430/320, 321, 945; 414/222, 225, 935; 198/347.1; 369/275.3

[56] References Cited

U.S. PATENT DOCUMENTS

| | | | |
|---|---|---|---|
| 4,534,695 | 8/1985 | Stump et al. | 414/225 |
| 4,613,751 | 9/1986 | Dreschler et al. | |
| 4,638,144 | 1/1987 | Latta, Jr. | 219/121.68 |
| 4,964,934 | 10/1990 | Gregg . | |
| 5,113,992 | 5/1992 | Sadamori | 198/347.1 |
| 5,304,455 | 4/1994 | Van Liempd | 430/945 |
| 5,403,397 | 4/1995 | Beckers et al. | 118/56 |
| 5,403,625 | 4/1995 | Legierse et al. | 427/470 |
| 5,608,717 | 3/1997 | Ito et al. | 369/275.3 |

FOREIGN PATENT DOCUMENTS

| | | |
|---|---|---|
| 0136445 | 7/1984 | European Pat. Off. . |
| 0118143 | 9/1984 | European Pat. Off. . |
| 0594255 | 4/1994 | European Pat. Off. . |
| 63-139811 | 11/1988 | Japan . |

OTHER PUBLICATIONS

Patent Abstract of Japan, vol. 012, No. 386 (M–754), Oct. 14, 1988 for JP 63 139811 A (Toshiba Corp.), Jun. 11, 1988.
"Musik nach digitalem Reinheitsgebot" Funkschen 15/1986, pp. 29–32 (Aug. 1986).

Primary Examiner—Geoffrey S. Evans
Attorney, Agent, or Firm—Fulbright & Jaworski, LLP

[57] ABSTRACT

A disc lacquering station, a laser beam recorder, a developing station and a metallizer are arranged in tandem. A cassette station (7) for the intermediate storage of substrates precedes and another follows the laser beam recorder. The cassette station (7) has a fixedly installed buffer magazine (9) for substrates and an extra magazine (10), removable from the apparatus, for additional substrates. In this manner substrates can be taken with the extra magazine from the cassette station preceding the laser beam recorder, recorded on a separate laser beam recorder, and then air-locked back into the production apparatus.

7 Claims, 1 Drawing Sheet

LACQUERING STATION
DEVELOPING STATION
METALLIZER
LASER BEAM RECORDER

APPARATUS FOR THE PRODUCTION OF EXPOSED AND METALLIZED SUBSTRATES

BACKGROUND OF THE INVENTION

The invention relates to an apparatus for the production of exposed and metallized substrates for the creation of master discs, which contains in series a disc lacquering station, a laser beam recorder, a developing station and a metallizer.

Apparatus of the above kind are presently being used for producing optically readable information media, especially compact discs, and they are generally known. In them the individual stations are arranged in tandem, so that the substrates can be transported successively and automatically from one station to the following station. It is a disadvantage in that case that the laser beam exposure of a substrate takes considerably more time than the operations to be performed on the rest of the stations. It might therefore be conceivable to equip an apparatus with a plurality of laser beam recorders so as to avoid undesirable slowing of production. Then, however, apparatus were developed which were considerably too expensive for many users to whom high production rates were not important.

SUMMARY OF THE INVENTION

The invention is addressed to the problem of developing an apparatus of the kind described above, which with little expense can be expanded such that higher production speeds can be achieved.

According to the invention, cassette stations for the temporary holding of substrates are provided before and after the laser beam recorder, each cassette station having a fixedly installed buffer magazine for substrates and an extra magazine removable from the apparatus for additional substrates. With each cassette station there is associated a handling system for the preferred filling and emptying of the buffer magazine followed by using the extra magazine.

In such an apparatus it is possible to take substrates from a position following the disc lacquering station, record them in one or even several additional laser beam recorders, and lastly, after leaving the laser beam recorder of the apparatus, to return the substrates through an airlock into the production run. Thus a high flexibility of production is achieved, which makes it possible to make full use of the capacity of the disc lacquering station and the developing and metallizing station that follows it, since additional laser beam recorders can be loaded with substrates with the extra magazine, as required.

The removal and reinsertion of the extra magazine into the cassette stations is especially easily and quickly performed if the extra magazine is releasably fastened on the buffer magazine.

The exchanging of substrates in the buffer magazine and extra magazine can be performed with a simply configured handling device, if the buffer magazine and the extra magazine have a plurality of substrate receivers stacked one over the other, into which substrates can be inserted, and if the buffer magazine and extra magazine unit are disposed for raising and lowering in the apparatus.

The invention is susceptible of numerous embodiments. For the further clarification of its basic principle, one of them is represented schematically in the drawing and will now be described.

DETAILED DESCRIPTION OF THE PREFERRED EMBODIMENT

Figure 1:
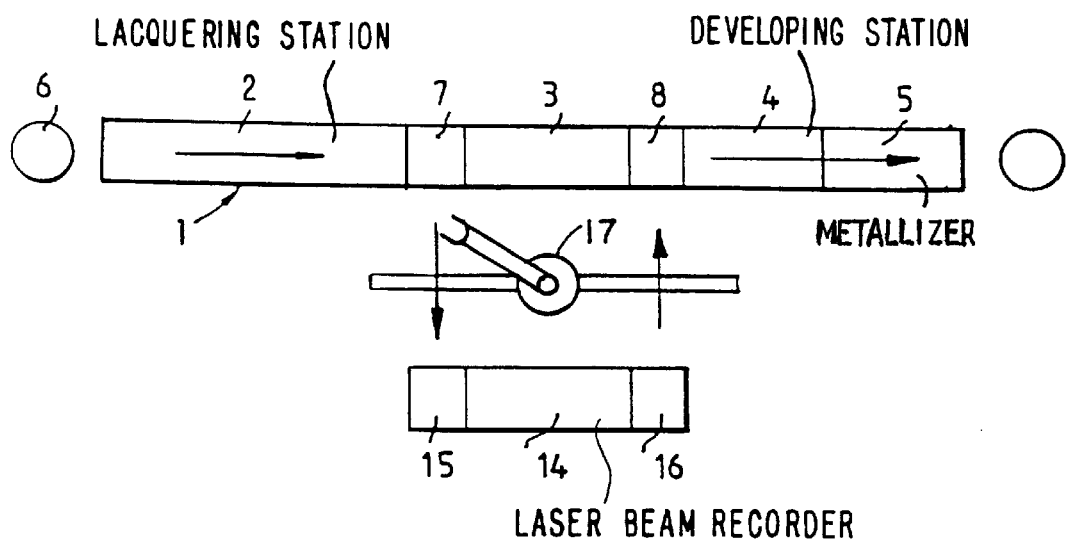
FIG. 1 is a schematic production diagram for the apparatus.

In FIG. 1 a production system 1 is represented schematically, which has in tandem a disc lacquering station 2 with dryer, a laser beam recorder 3, a developing station 4, and a metallizer 5. The substrates 6 to be processed pass through these individual stations from left to right as seen in the drawing.

Figure 2:
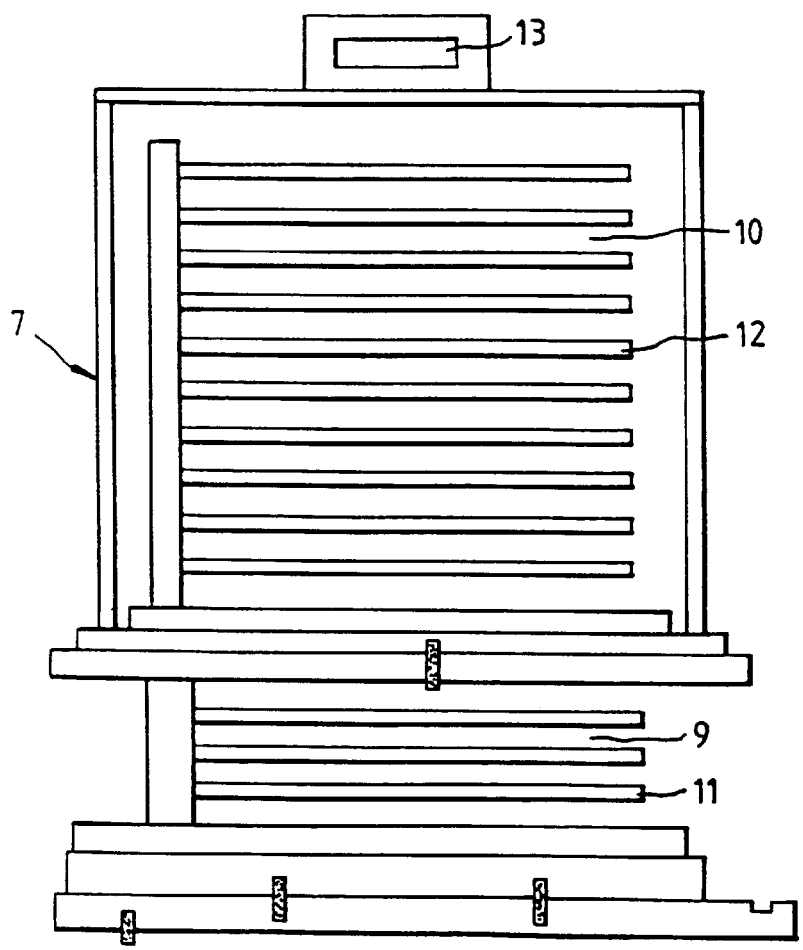
FIG. 2 is an elevation view of a cassette station.

It is important for the invention that a cassette station 7 precedes and a cassette station 8 follows the laser beam recorder. The more precise configuration of the cassette stations 7 and 8 can be seen in FIG. 2.

Each cassette station 7 or 8 has a fixedly installed buffer magazine 9, and over it an extra magazine 10. In the embodiment shown the buffer magazine 9 has a total of three substrate receivers 11, one over the other, while the extra magazine 10 is provided with a total of ten such substrate receivers 12. On its top side the extra magazine 10 has a handle 13, so that it can be comfortably carried.

FIG. 1 shows parallel to the laser beam recorder 3 an additional laser beam recorder 14 with a cassette station 15 preceding it and a cassette station 16 following it. With the configuration according to the invention it is possible to remove from the production line at the cassette station 7 an extra magazine 10 filled with substrates 6 and insert it into the cassette station 15 of the parallel laser beam recorder 14. Recorded substrates of the laser beam recorder 14 can likewise be returned from the cassette station 16 into the production run by inserting the corresponding extra magazine 10 into the cassette station 8. Transfer between cassette stations 7 and 15, and between cassette stations 16 and 8, is accomplished by a robotic handling system 17. A swing arm may accomplish transfer by both vertical and rotational movement. Alternatively, if a raising and lowering device 18 is provided for the magazines as shown schematically in FIG. 2, transfer may be accomplished by only rotational movement.

We claim:

1. Apparatus for the production of substrates exposed to light and metallized for the production of master discs, said apparatus comprising, in the following order, a disc lacquering station, a first cassette station comprising a first buffer magazine and a first extra magazine, a laser beam recorder, a second cassette station comprising a second buffer magazine and a second extra magazine, a developing station, and a metallizer, said apparatus further comprising a handling system for preferential loading and unloading of the buffer magazines followed by loading and unloading of the extra magazines.

2. Apparatus as in claim 1 wherein each of said buffer magazines and each of said extra magazines has a plurality of substrate receivers arranged one above the other for receiving respective horizontally disposed discs.

3. Apparatus as in claim 2 wherein each of said buffer magazines and each of said extra magazines are arranged one above the other at each of said cassette stations.

4. Apparatus as in claim 3 wherein said handling system comprises means for raising and lowering said magazines respectively at each of said cassette stations.

5. Apparatus as in claim 1 further comprising
- a first auxiliary cassette station to which discs can be transferred from the first cassette station by the handling system,
- an auxiliary laser beam recorder to which discs can be transferred from the first auxiliary cassette station, and
- a second auxiliary cassette station to which said discs can be transferred from the auxiliary laser beam recorder, and from which said discs can be transferred to said second cassette station by said handling system.

6. Apparatus as in claim 5 wherein each said auxiliary cassette station comprises a buffer magazine and an extra magazine.

7. Apparatus as in claim 1 wherein each of said extra magazines is releasably fastened to each of said buffer magazines at each of said cassette stations.

* * * * *